(12) United States Patent
Kubota

(10) Patent No.: US 7,644,811 B2
(45) Date of Patent: Jan. 12, 2010

(54) LOCK-UP DEVICE OF HYDRAULIC TORQUE TRANSMITTING APPARATUS

(75) Inventor: Tetsuya Kubota, Neyagawa (JP)

(73) Assignee: Exedy Corporation, Osaka (JP)

( * ) Notice: Subject to any disclaimer, the term of this patent is extended or adjusted under 35 U.S.C. 154(b) by 416 days.

(21) Appl. No.: 11/597,901

(22) PCT Filed: Dec. 15, 2004

(86) PCT No.: PCT/JP2004/018736

§ 371 (c)(1),
(2), (4) Date: Nov. 29, 2006

(87) PCT Pub. No.: WO2005/119098

PCT Pub. Date: Dec. 15, 2005

(65) Prior Publication Data

US 2008/0011570 A1  Jan. 17, 2008

(30) Foreign Application Priority Data

Jun. 3, 2004 (JP) .............................. 2004-165735

(51) Int. Cl.
*F16H 45/02* (2006.01)
(52) U.S. Cl. .................................................. 192/3.29
(58) Field of Classification Search ................. 192/3.29
See application file for complete search history.

(56) References Cited

U.S. PATENT DOCUMENTS

| | | | | |
|---|---|---|---|---|
| 5,501,309 A | * | 3/1996 | Walth et al. | 192/3.29 |
| 5,613,582 A | * | 3/1997 | Jackel | 192/3.29 |
| 6,497,312 B1 | | 12/2002 | Sasse et al. | |
| 2002/0046912 A1 | * | 4/2002 | Suzuki | 192/3.29 |

FOREIGN PATENT DOCUMENTS

| | | | |
|---|---|---|---|
| JP | 02-116059 U | | 9/1990 |
| JP | 04300447 A | * | 10/1992 |
| JP | 11-063151 A | | 3/1999 |
| JP | 11-351353 A | | 12/1999 |
| JP | 2000-088079 A | | 3/2000 |

* cited by examiner

*Primary Examiner*—Richard M. Lorence
(74) *Attorney, Agent, or Firm*—Global IP Counselors, LLP

(57) ABSTRACT

A lock-up device 7 includes a front cover 2, an impeller 3, a turbine 4, and a piston 22 positioned to divide a space between the front cover 2 and the turbine 4, and is engageable with the front cover 2. The piston 22 is formed with a plurality of projections 41 extending in the radial direction on a surface 42. The projection 41 has a straight front edge 51 and a straight rear edge 52, and an arced radially outer edge 53 and radially inner edge 54. The rear edge 52 in the rotation direction overlaps a straight line Ls connecting a radially inner end 52a with the rotation center O, or the rear edge 52 in the rotation direction is inclined to the straight line Ls such that a radially outer end 52b is positioned rearward of the straight line Ls in the rotation direction.

23 Claims, 7 Drawing Sheets

Lock-up responsivity of the conventional product (without ribs)

Lock-up responsivity of the product according to the present invention (with ribs)

Comparison of lock-up responsivity between the conventional product and the product according to the present invention

LOCK-UP DEVICE OF HYDRAULIC TORQUE TRANSMITTING APPARATUS

TECHNICAL FIELD

The present invention relates to lock-up devices of hydraulic torque transmitting apparatuses, particularly, to lock-up devices in which a piston presses itself against a front cover.

BACKGROUND ART

Torque converters are apparatuses that transmit torque from the engine to the transmission via a working fluid therein, and mainly include a front cover to which torque is input from the engine, an impeller fixed to a transmission side of the front cover to constitute a fluid chamber therebetween, a turbine located opposite an engine side of the impeller to output the torque to the transmission, and a stator located between a radially inner portion of the impeller and a radially inner portion of the turbine to adjust the flow of the working fluid from the turbine to the impeller.

A lock-up device is located in a space between the turbine and the front cover, and directly transmits the torque from the front cover to the turbine by mechanically engaging the front cover with the turbine. The lock-up device includes, for example, a disc-like piston to be pressed against a friction surface of the front cover for engagement, and an elastically coupling mechanism to transmit the torque between the piston and the turbine.

In the lock-up device, the piston has a frictionally coupling portion at a radially outer portion that is frictionally engageable with the front cover. Furthermore, the piston divides a space between the front cover and the turbine into a first hydraulic chamber near the front cover and a second hydraulic chamber, and can move in the axial direction due to a differential pressure between the first hydraulic chamber and the second hydraulic chamber (Refer to Patent Document 1, for example.). Next, the operation of the lock-up device will be described. When torque is transmitted through the fluid, working fluid is supplied to the first hydraulic chamber from the center, i.e., the working fluid flows radially outward and flows into the fluid operating chamber of the torque converter. Accordingly, the piston is separated from the front cover in the axial direction, i.e., in a clutch disengagement state. Then, at the lock-up engagement operation, the hydraulic circuit is switched to exhaust the working fluid in the first hydraulic chamber radially inward. Accordingly, the hydraulic pressure in the first hydraulic chamber becomes lower than that in the second hydraulic chamber so that the piston approaches the front cover. As a result, the frictionally coupling portion of the piston is forcefully pressed against the front cover, i.e., in a clutch engagement state.

Patent Document 1: Japanese Unexamined Patent Publication H11-63151

DISCLOSURE OF INVENTION

The employment of the lock-up device improves fuel consumption, which has been considered a defect of automatic transmission cars, and makes engine braking more effective. Furthermore, the electronified transmission control has shown a high tendency to use the lock-up in a wide range, e.g., the lock-up control from the first gear or the slip control of the lock-up. In particular, attempts have been made to operate the lock-up when the engine braking is used to make engine braking more effective.

However, if the lock-up operation range is widened to a coasting range (in a state that the output rotation speed is higher than the input rotation speed), the problem of deterioration of operating responsivity in the lock-up device becomes remarkable. Generally, the operating responsivity of the lock-up device is determined by a time from the switching of the lock-up circuit to the engagement of the lock-up clutch. During the coasting, the direction of the flow of the working fluid is reversed in the torque converter so that the working fluid flows from the radially outer portion of the turbine toward the impeller, and then flows from the radially inner portion of the impeller toward the turbine through the stator. Accordingly, since the working fluid flows between the radially outer portions of the turbine and the impeller into the torus during the coasting from a space between the turbine and the front cover, it is likely that the hydraulic pressure in the second hydraulic chamber is lowered. Consequently, generally speaking, the lock-up operation responsivity is not good.

In particular, the fact that it takes too much time to lower the hydraulic pressure in the first hydraulic chamber may be one reason for the lowering of lock-up operation responsivity. In the first hydraulic chamber, when starting to exhaust the working fluid, the working fluid gradually moves toward the center (radially inward) while flowing generally in the rotation direction (going around). Accordingly, it takes a certain time to exhaust the working fluid.

It is an object of the present invention to improve the lock-up operation responsivity during the coasting in a lock-up device in which a piston is engageable with a front cover.

According to a first aspect of the present invention, a lock-up device is used for a hydraulic torque transmitting apparatus including a front cover to which torque is input, an impeller fixed to the front cover to constitute a fluid chamber filled with a working fluid, and a turbine located opposite the impeller in the fluid chamber, and includes a piston. The piston is located so as to divide a space between the front cover and the turbine into a first hydraulic chamber on a side of the front cover and a second hydraulic chamber on a side of the turbine. The piston is engageable with and disengageable from the front cover due to a differential pressure between the first and second hydraulic chambers. The piston is a plate-like member and has a plurality of projections extending in the radial direction on a surface formed on a side of the first hydraulic chamber. The projection has a straight front edge and straight rear edges in the rotation direction, and an arced radially outer edge and an arced radially inner edge. The rear edge in the rotation direction overlaps a straight line Ls connecting a radially inner end thereof and the rotation center, or the rear edge in the rotation direction is inclined to the straight line Ls such that a radially outer end thereof is positioned rearward of the straight line Ls in the rotation direction.

In this lock-up device, the piston is moved in the axial direction due to the change of hydraulic pressure to press itself against the front cover for clutch engagement, for example, or leaves the front cover for clutch disengagement. During the lock-up engagement operation, the working fluid in the first hydraulic chamber is exhausted toward the center. At this time, the working fluid gradually moves toward the center as flowing generally in the rotation direction, but collides against the projections. The working fluid is guided radially inward along the projections so that the working fluid can be rapidly exhausted. As a result, the pressure drop in the first hydraulic chamber is developed so that the lock-up operation responsivity during the coasting can be improved.

Since the rear edge in the rotation direction overlaps the straight line Ls connecting the radially inner end with the rotation center, or the rear edge in the rotation direction is inclined to the straight line Ls such that the radially outer end is positioned rearward of the straight line Ls in the rotation direction, the fluid is attracted toward the projections from the rear due to the pressure drop along the rear edge in the rotation direction, and is guided radially inward along the rear edge.

A lock-up device according to a second aspect of the present invention is the lock-up device of the first aspect, wherein the front edge in the rotation direction overlaps a straight line Lp connecting a radially inner end thereof with the rotation center, or the front edge in the rotation direction is inclined to the line Lp such that a radially outer end thereof is positioned rearward of the straight line Lp in the rotation direction. Conversely, if the front edge in the rotation direction is inclined to the straight line Lp such that the front edge is positioned forward of the line Lp in the rotation direction, the centrifugal force is increased and the lock-up operation responsivity is deteriorated because the effects of pushing the fluid forward in the rotation direction to increase the rotation speed is increased.

A lock-up device according to a third aspect of the present invention is the lock-up device of the second aspect, wherein $S_2 < S_1$, where $S_1$ is a circumferential length of the radially outer edge of a projection, and $S_2$ is a circumferential length of the radially inner edge of the projection.

A lock-up device according to a fourth aspect of the present invention is the lock-up device of the third aspect, wherein $S_1 \leq (2\pi r_1)/8$, where $r_1$ is a radius of the radially outer edge.

A lock-up device according to a fifth aspect of the present invention is the lock-up device of the third or fourth aspect, wherein $S_2 < (2\pi r_2)/8$, where $r_2$ is a radius of the radially inner edge.

A lock-up device according to a sixth aspect of the present invention is the lock-up device of the fourth or fifth aspect, wherein $S_2$ is 6 mm or more.

A lock-up device according to a seventh aspect of the present invention is the lock-up device of any of the first through sixth aspects, wherein the front edge in the rotation direction has a front wall surface at an angle βp with the surface except for the projections. The rear edge in the rotation direction has a rear wall surface at an angle βs with the surface except for the projections, and βp≦βs.

In this lock-up device, since the angle βs of the rear edge in the rotation direction is sufficiently large, the pressure drop along the rear edge in the rotation direction is increased.

A lock-up device of the hydraulic torque transmitting apparatus according to an eighth aspect of the present invention is the lock-up device of the seventh aspect, wherein βp<βs.

In this lock-up device, since the angle βs of the rear edge in the rotation direction is sufficiently large, the pressure drop along the rear edge in the rotation direction is increased.

A lock-up device according to a ninth aspect of the present invention is the lock-up device of the seventh or eighth aspect, wherein βs is in the range between 80 degrees and 100 degrees, inclusive.

In this lock-up device, since the angle βs of the rear edge in the rotation direction is sufficiently large, the pressure drop along the rear edge in the rotation direction is increased.

According to a tenth aspect of the present invention, a lock-up device is used for a hydraulic torque transmitting apparatus including a front cover to which torque is input, an impeller fixed to the front cover to constitute a fluid chamber filled with a working fluid, and a turbine located opposite the impeller in the fluid chamber, and includes a piston. The piston is located so as to divide a space between the front cover and the turbine into a first hydraulic chamber on a side of the front cover and a second hydraulic chamber on a side of the turbine. The piston is engageable with and disengageable from the front cover due to a differential pressure between the first and second hydraulic chambers. The piston is a plate-like member and has a plurality of projections extending in the radial direction on a surface formed on a side of the first hydraulic chamber. The projection has a straight front edge and a straight rear edge in the rotation direction, and an arced radially outer edge and an arced radially inner edge. The front edge in the rotation direction has a front wall surface at angle βp with the surface except for the projections. The rear edge in the rotation direction has a rear wall surface at angle βs with the surface except for the projections, and βp≦βs.

In this lock-up device, the piston is moved in the axial direction due to the change of the hydraulic pressure to press itself against the front cover for clutch engagement, for example, or leaves the front cover for clutch disengagement. During the lock-up engagement operation, the working fluid in the first hydraulic chamber is exhausted toward the center. At this time, the working fluid gradually moves toward the center flowing generally in the rotation direction, but collides against the projections. The working fluid is guided radially inward along the projections, so that the working fluid can be rapidly exhausted. As a result, the pressure drop in the first hydraulic chamber is developed, so that the lock-up operation responsivity during the coasting can be improved.

In particular, since βp≦βs, and the angle βs of the rear edge in the rotation direction is sufficiently large, the pressure drop along the rear edge in the rotation direction is increased.

A lock-up device according to an eleventh aspect of the present invention is the lock-up device of the tenth aspect, wherein βp<βs.

In this lock-up device, since the angle βs of the rear edge in the rotation direction is sufficiently large, the pressure drop along the rear edge in the rotation direction is increased.

A lock-up device according to a twelfth aspect of the present invention is the lock-up device of the tenth or eleventh aspect, wherein βs is in the range between 80 degrees and 100 degrees, inclusive.

In this lock-up device, since the angle βs of the rear edge in the rotation direction is sufficiently large, the pressure drop along the rear edge in the rotation direction is increased.

In this lock-up device according to the present invention, the projections improve the lock-up operation responsivity during coasting.

Figure 1:
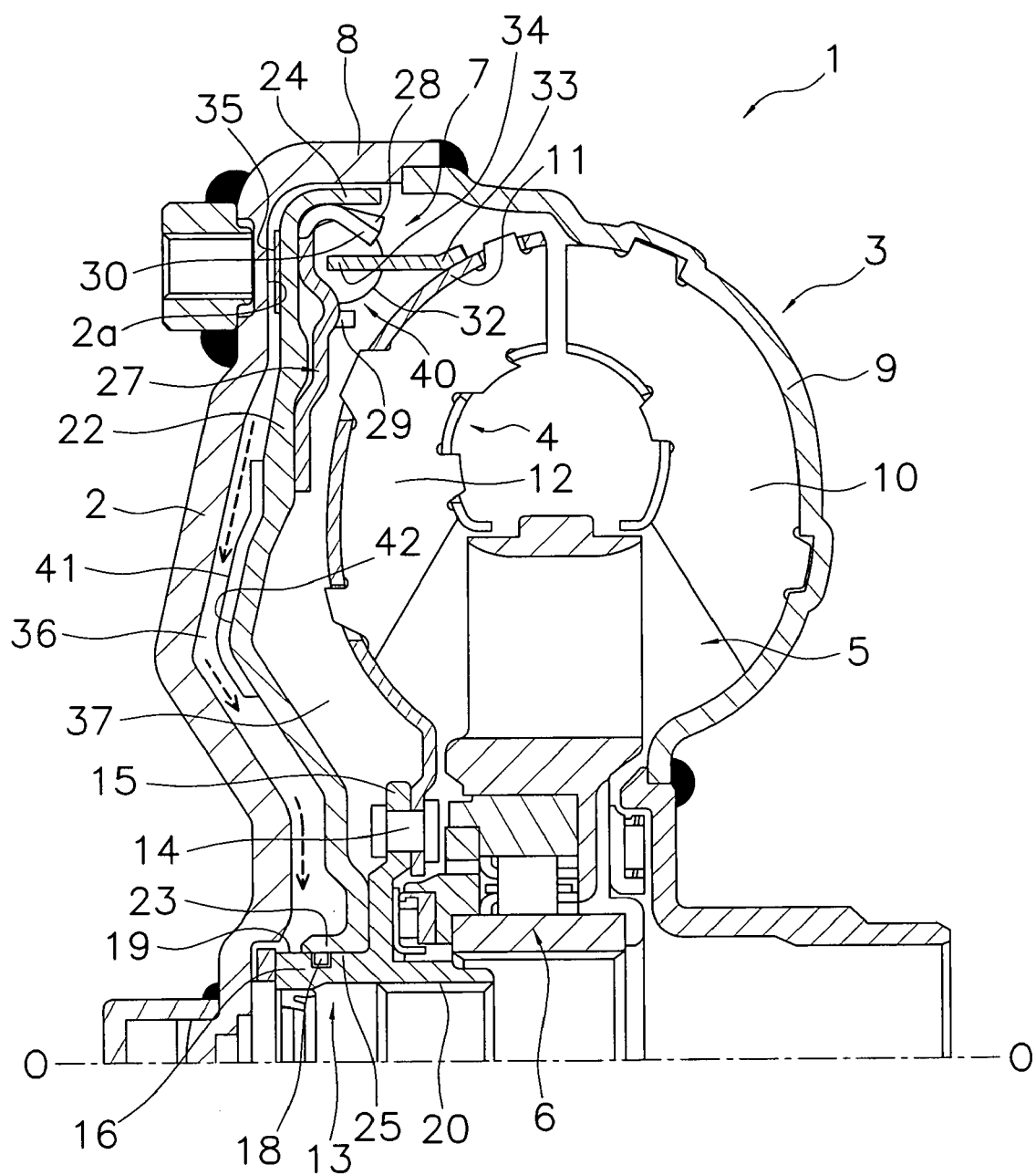
FIG. 1 is a longitudinal cross-sectional schematic diagram of the torque converter in which one embodiment of the present invention is employed.

EXPLANATIONS OF LETTERS OR NUMERALS 1 torque converter (hydraulic torque transmission apparatus)
2 front cover
2a friction surface
3 impeller
4 turbine
7 lock-up clutch (lock-up device)
22 piston
41 projection

BEST MODE FOR CARRYING OUT THE INVENTION

1. Overall Structure of the Torque Converter

Hereinafter, a description will be made on one embodiment of the present invention with reference to figures.

FIG. 1 shows a torque converter 1 according to one embodiment of the present invention. The torque converter 1 will be employed in a vehicle. The line O-O in FIG. 1 is the axis of rotation of the torque converter 1. In FIG. 1, the torque converter 1 has a front cover 2, and an impeller shell 9 fixed to a radially outer projection 8 of the front cover 2 to constitute a fluid chamber. The front cover 2 can be attached to a component on the engine side (not shown), and the torque is input to the front cover 2. The impeller shell 9 has an inner side to which a plurality of impeller blades 10 is fixed. The impeller shell 9 and the impeller blades 10 constitute an impeller 3. A turbine 4 is located in the fluid chamber opposite the impeller 3. The turbine 4 is constituted by a turbine shell 11 and a plurality of turbine blades 12 fixed to the turbine shell 11. The turbine shell 11 has a radially inner end fixed to a flange 15 of a turbine hub 13 by rivets 14. The turbine hub 13 is formed with splined slots 20 on an inner circumference thereof with which a main drive shaft (not shown) of the transmission is engaged.

A stator 5 is located between a radially inner portion of the impeller 3 and a radially inner portion of the turbine 4. The stator 5 adjusts the direction of the working fluid returning from the turbine 4 to the impeller 3, and is supported by a fixed shaft (not shown) via a one-way clutch 6.

2. Structure of the Lock-Up Clutch

A lock-up clutch 7 is located in a space between the front cover 2 and the turbine 4, and is a device to couple mechanically the front cover 2 with the turbine 4. The lock-up clutch 7 is mainly constituted by a piston 22, and an elastically coupling mechanism 40 to couple elastically the piston 22 with the turbine 4.

The piston 22 is a disc-like member, and is located so as to divide the space between the front cover 2 and the turbine shell 11 into a first hydraulic chamber 36 near the front cover 2 and a second hydraulic chamber 37 near the turbine 4. The piston 22 is a plate metal having a small thickness. The piston 22 has a radially inner cylindrical portion 23 extending toward the transmission at the radially inner end. The radially inner cylindrical portion 23 is supported on an outer circumference 19 of a tubular portion 16 formed at the radially innermost portion of the flange 15 of the turbine hub 13 so as to be relatively movable in the axial direction and the circumferential direction. In other words, an inner circumference 25 of the radially inner cylindrical portion 23 is in contact with the outer circumference 19 of the tubular portion 16. An annular groove, in which a seal ring 18 is disposed, is formed at the axially intermediate position of the outer circumference 19 of the tubular portion 16. The seal ring 18 is in contact with the inner circumference 25 of the radially inner cylindrical portion 23. Accordingly, the seal ring 18 serves as a seal for the radially inner portions of the first hydraulic chamber 36 and the second hydraulic chamber 37.

A radially outer tubular portion 24 extending toward the transmission is formed at a radially outer portion of the piston 22. In addition, an annular friction facing 35 (frictionally coupling portion) is adhered onto an engine-side of the radially outer portion of the piston 22. The friction facing 35 is opposed to an annular and flat friction surface 2a formed on an inner side of the radially outer portion of the front cover 2. The engagement between the friction facing 35 and the front cover friction surface 2a constitutes a seal for the radially outer portions of the first hydraulic chamber 36 and the second hydraulic chamber 37.

Figure 2:
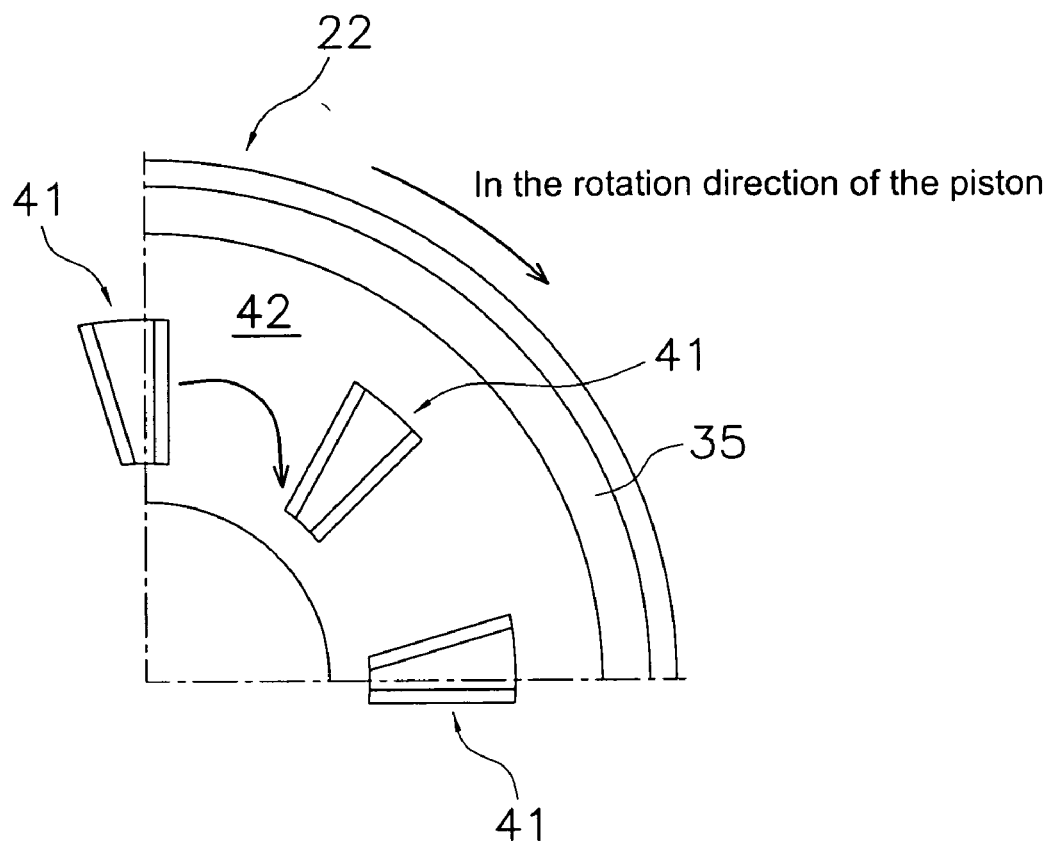
FIG. 2 is a partial plan view of the flow of the working fluid in the first hydraulic chamber during the lock-up engagement operation.

A plurality of projections 41 is formed at a radially intermediate portion of the piston 22. The projection 41 is formed by drawing, and is a rib projecting toward the front cover 2 in the axial direction. As shown in FIG. 2, the projections 41 are arranged in the circumferential direction, and each of them extends in straight lines in the radial direction. In other words, the projections 41 are formed in a radial pattern on the piston 22. The above-described projections 41 define a generally flat surface 42 and the projections 41 are located alternately in the circumferential direction on a surface of the piston 22 opposite the front cover 2 in the axial direction. The projections 41 project a little bit from the surface 42 in the axial direction. Note that the projections 41 are arranged equidistantly in the circumferential direction.

Figure 3:
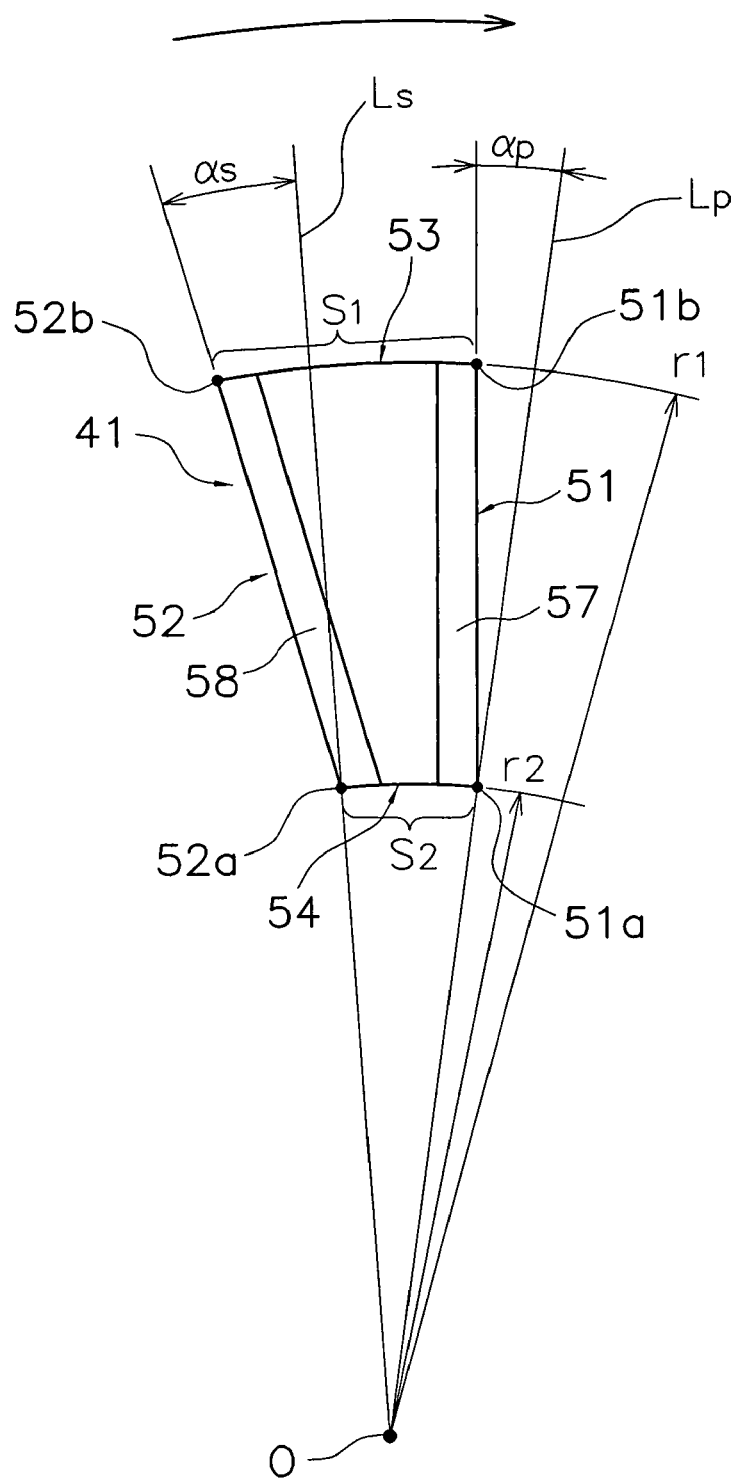
FIG. 3 is a detailed plan view of the projections.

Referring to FIG. 3, a detailed description will be made on the shape of the projection 41. The projection 41 extends radially outward on a surface opposite the first hydraulic chamber 36. The projection 41 has a straight front edge 51 in the rotation direction and a straight rear edge 52 in the rotation direction, and an arced radially outer edge 53 and an arced radially inner edge 54.

The front edge 51 in the rotation direction is a front side in the rotation direction, i.e., a "pressure side." More specifically, the front edge 51 is inclined αp degrees to a straight line Lp connecting a radially inner end 51a with the rotation center O such that a radially outer end 51b is positioned rearward of the line Lp in the rotation direction. Note that the front edge 51 in the rotation direction may overlap the straight line Lp. In other words, the radially outer portion of the front edge 51 in the rotation direction is not positioned forward of the radially inner portion in the rotation direction.

Meanwhile, the rear edge 52 in the rotation direction is a rear side in the rotation direction, i.e., a "suction" side. More specifically, the rear edge 52 in the rotation direction is inclined as to a straight line Ls connecting a radially inner end 52a with the rotation center O such that a radially outer end 52b is positioned rearward of the line Ls in the rotation direction. Note that the rear edge 52 in the rotation direction may overlap the straight line Ls. In other words, the radially outer portion of the rear edge 52 in the rotation direction is not positioned forward of the radially inner portion in the rotation direction.

Since αp<αs, a circumferential length $S_1$ of the radially outer edge 53 is longer than a circumferential length $S_2$ of the radially inner edge 54.

$S_1 \leq (2\pi r_1)/8$, where $r_1$ is a radius of the radially outer edge 53. $S_2 < (2\pi r_2)/8$, where $r_2$ is a radius of the radially inner edge 54. The circumferential length $S_2$ of the radially inner edge 54 is 6 mm or more.

Figure 4:
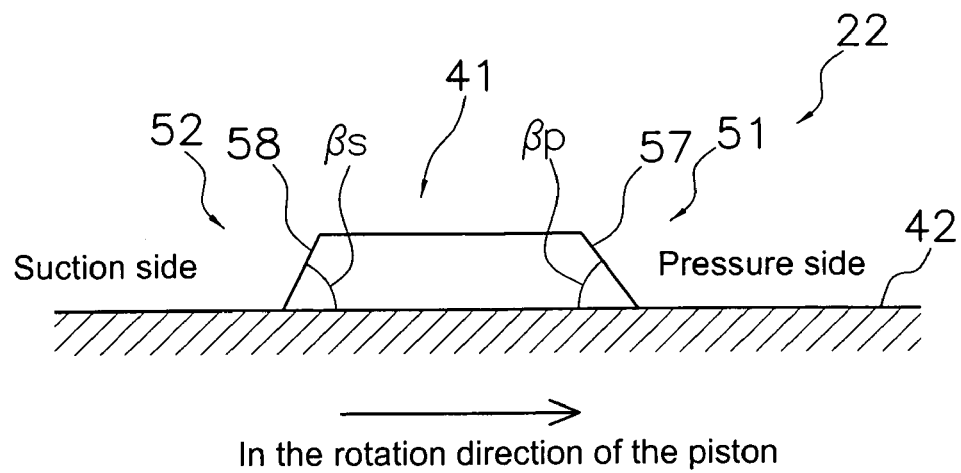
FIG. 4 is a diagram of the three-dimensional shape of the projections.

As shown in FIG. 4, the front edge 51 in the rotation direction has a front wall surface 57 at angle βp with the surface 42 (surface other than projections). The rear edge 52 in the rotation direction has a rear wall surface 58 at angle βs with the surface other than the projections. More precisely, the angle βp and the angle βs are respectively angles in cross section in the circumferential direction the front wall surface 57 and the rear wall surface 58 make against the surface 42. In the embodiment, the angle βp is 52 degrees; the angle βs is 65 degrees; and βp<βs. Note that βp may be equal to βs.

Figure 5:
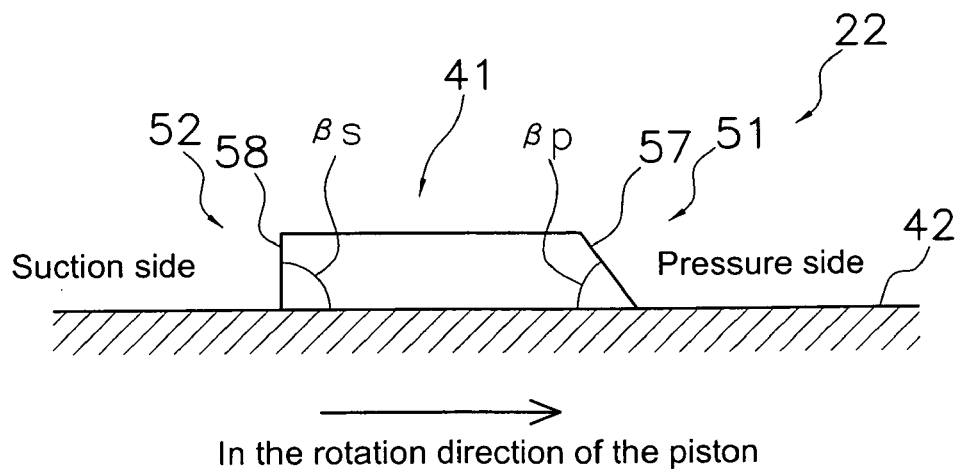
FIG. 5 is a diagram of the three-dimensional shape of the projections in a modification example.

In another embodiment shown in FIG. 5, βs is 90 degrees. βs is preferably in the range between 80 degrees and 100 degrees, inclusive.

The elastically coupling mechanism 40 is located between the piston 22 and the turbine 4, more specifically, between the radially outer portion of the piston 22 and the radially outer portion of the turbine shell 11. The elastically coupling mechanism 40 is constituted by a retaining plate 27 as a drive member, a driven plate 33 as a driven member, and a plurality of coil springs 32 located between both the plates 27 and 33. The retaining plate 27 is an annular plate member located on a side of the radially outer portion of the piston 22 near the transmission, i.e., radially inward of the radially outer tubular portion 24. The retaining plate 27 has a radially inner portion fixed to the piston 22 by a plurality of rivets (not shown). The retaining plate 27 is a member that holds the coil springs 32, and is engaged with the circumferential ends of the coil springs 32 to transmit torque thereto. The retaining plate 27 has retaining portions 28 and 29 to respectively support radially outer and inner sides of the coil springs 32 arranged in the circumferential direction. The radially inner retaining portion 29 is cut out from the disc-like portion of the retaining plate 27. Furthermore, the retaining plate 27 has engagement portions 30 to support the circumferential ends of the coil springs 32. The driven plate 33 is an annular plate member fixed to a rear face of the radially outer portion of the turbine shell 11. The driven plate 33 is formed with a plurality of claws 34 extending toward the engine at several positions arranged in the circumferential direction. The claws 34 are engaged with the circumferential ends of the coil springs 32. Accordingly, the torque from the retaining plate 27 is transmitted to the driven plate 33 via the coil springs 32.

3. Operation of the Torque Converter

A description will be made on the operation of the torque converter 1. When the torque is transmitted from the engine to the front cover 2, the impeller 3 is rotated with the front cover 2. Accordingly, the working fluid flows from the impeller 3 to the turbine 4 to rotate the turbine 4. The torque of the turbine 4 is transmitted to the main drive shaft (not shown). During this time, the working fluid is supplied into the first hydraulic chamber 36 from the radially inner portion. The working fluid flows radially outward in the first hydraulic chamber 36, then flows toward the transmission in the axial direction, and finally flows into the fluid operating chamber (torus). Accordingly, the piston 22 is moved farthest to the turbine 4 in the axial direction, and the friction facing 35 of the piston 22 is apart from the friction surface 2a of the front cover 2. Note that the working fluid in the fluid operating chamber is exhausted between the radially inner portions of the turbine 4 and the stator 5.

When the lock-up is engaged, the hydraulic circuit is switched to drain the working fluid in the first hydraulic chamber 36 from the radially inner portion thereof. Accordingly, the hydraulic pressure in the first hydraulic chamber 36 becomes lower than that of the second hydraulic chamber 37. As a result, the piston 22 is moved toward the front cover 2, so that the friction facing 35 is forcefully pressed against the friction surface 2a of the front cover 2. Note that during this time the working fluid is supplied into the fluid operating chamber between the radially inner portions of the impeller 3 and the stator 5.

A detailed description will be made on the above-described moving operation of the piston 22. When starting to drain the working fluid in the first hydraulic chamber 36 shown in FIG. 1, the working fluid starts to move radially inward as moving generally in the rotation direction, as in the conventional example. However, in the present embodiment, since the piston 22 is formed with the projections 41, the working fluid on the surface of the piston 22 collides with the projections 41 forward in the rotation direction, and is turned radially inward, i.e., toward the center. In other words, the working fluid on the suction sides of the projections 41 moves along the projections 41 in straight lines radially inward. Accordingly, the working fluid can rapidly move radially inward. Since the time to drain the working fluid becomes short, the time during which the hydraulic pressure is lowered in the first hydraulic chamber 36 becomes short. Consequently, the operating responsivity of the piston 22 can be improved, thereby obtaining a sufficient operating responsivity while coasting.

The rear edge 52 in the rotation direction overlaps the straight line Ls connecting the radially inner end 52a with the rotation center O, or the rear edge 52 in the rotation direction is inclined to the straight line Ls such that the radially outer end 52b is positioned rearward of the straight line Ls in the rotation direction, the pressure drop generated along the rear edge 52 in the rotation direction attracts the fluid to the projection 41 from the rear and guides the fluid radially inward along the rear edge 52.

The front edge 51 in the rotation direction has the front wall surface 57 at the angle βp with the surface 42, and the rear edge 52 in the rotation direction has the rear wall surface 58 at angle βs with the surface 42, and βp<βs. Accordingly, since the angle βs of the rear edge 52 in the rotation direction is sufficiently large, the pressure drop generated along the rear edge 52 in the rotation direction is increased.

Conversely, if the front edge in the rotation direction is inclined to a straight line connecting the radially inner end and the rotation center O such that the radially outer end is positioned forward of the straight line in the rotation direction (for example, the radially outer portion of the rib is positioned forward of the radially inner portion in the rotation direction), an effect of pushing the fluid forward in the rotation direction to increase the rotation speed is increased. As a result, the rotation speed of the fluid is increased so that the centrifugal force is increased. The pressure against the clutch facings in the space is increased, thereby contributing to the decrease in the clearance between the clutch facing and the front cover. If the rear edge in the rotation direction is inclined to the straight line connecting the radially inner end with the rotation center O such that the radially outer end is positioned forward of the straight line in the rotation direction (for example, if the rib has a cross section inclined to the rotation direction), the pressure drop generated along the rear edge in the rotation direction is decreased so that it is unlikely that the fluid is attracted to the projection from rearward. Consequently, it is difficult to obtain the beneficial effects of the present invention.

(Experiment 1)

The lock-up ON responsivities were compared between the conventional lock-up device and the lock-up device according to the present invention. The measurement was carried out using the same products except for the lock-up device, i.e., the lock-up piston and the damper.

Figure 6:
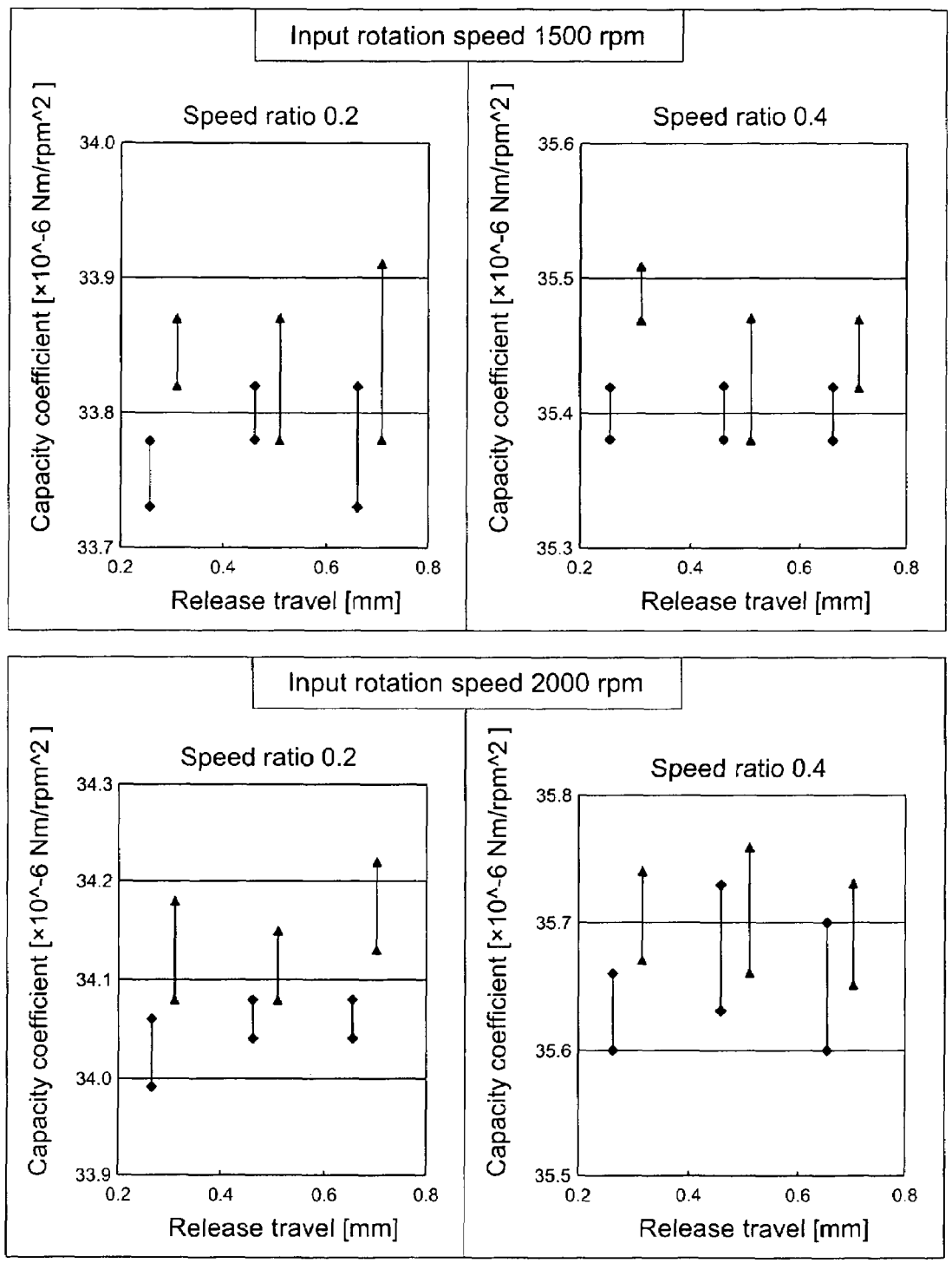
FIG. 6 is a graph plotting the comparison of the capacity factor between a conventional product and the product according to the present invention.

Performances of the torque converters were compared between the conventional product (without ribs) and a product according to the present invention (with ribs). In FIG. 6, ranges of variation of the capacity factor to the release travels were measured in four cases, more specifically, in two cases in which the input rotation speed was 1500 rpm, and the speed ratios were 0.2 and 0.4, and in two cases in which the input rotation speed was 2000 rpm and the speed ratios were 0.2 and 0.4. The release travels were set to be near 0.3 mm, 0.5 mm, and 0.7 mm. Note that the release travel means a clearance between the friction facing of the piston and the friction surface of the front cover. The speed ratios of 0.2 and 0.4 are in the low speed ratio area.

As is apparent from FIG. 6, the product according to the present invention (with ribs) had a higher capacity factor in comparison to the conventional product (without ribs). The capacity factor was high although three elements of the torque converter were the same because the thrust of the lock-up piston against the front cover was increased. In other words, in the above-described experiments, in the product according to the present invention, the hydraulic pressure between the front cover and the piston was dropped in comparison to the conventional product, thereby increasing the thrust of the piston against the front cover. Generally, if hydraulic pressures at the inlet and outlet of both apparatuses are equivalent in the torque converter operating range, the lower the hydraulic pressure between the front cover and the piston in the fluid chamber is, the higher the responsivity of lock-up ON (OFF to ON) is. Accordingly, the lock-up responsivity according to the present invention is improved.

(Experiment 2)

Figure 7:
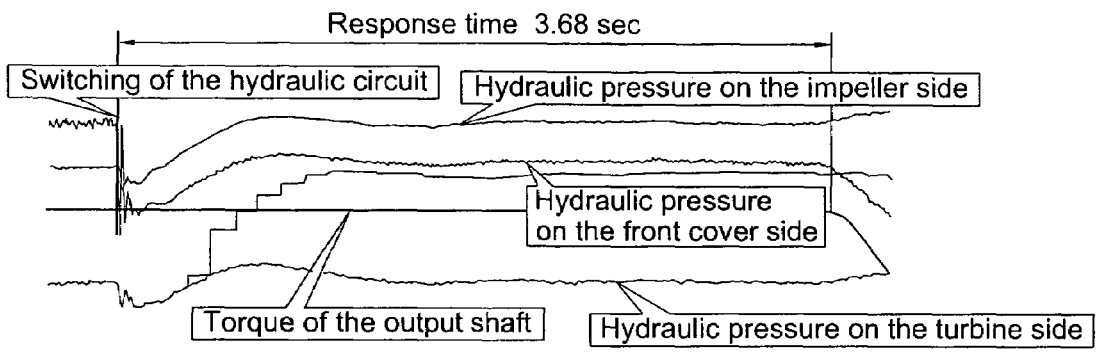
FIG. 7 is a graph plotting the comparison of the lock-up responsivity between the conventional product and the product according to the present invention.
Figure 7:
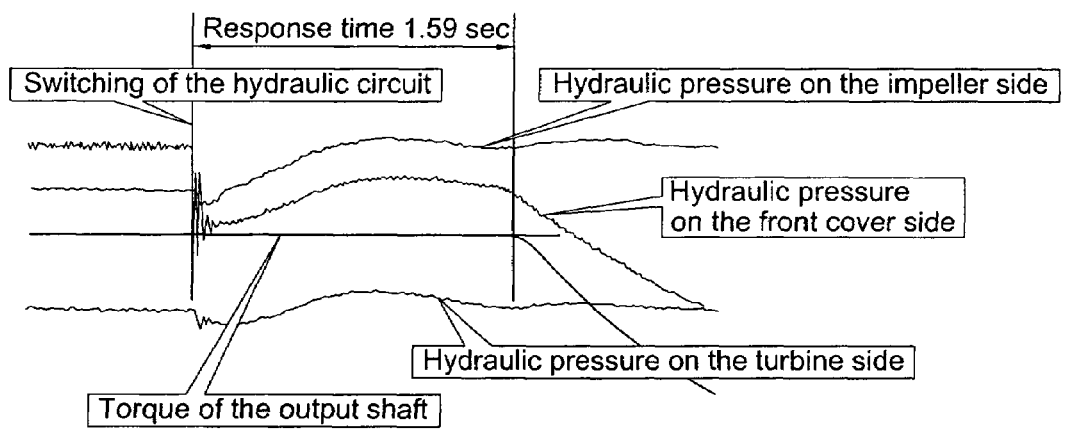
Figure 7:
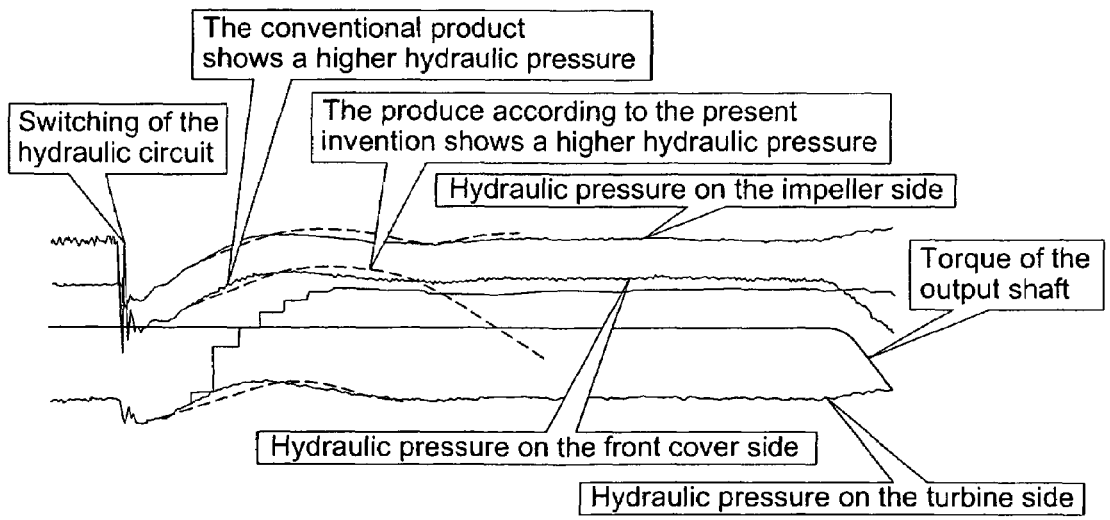
Figure 8:
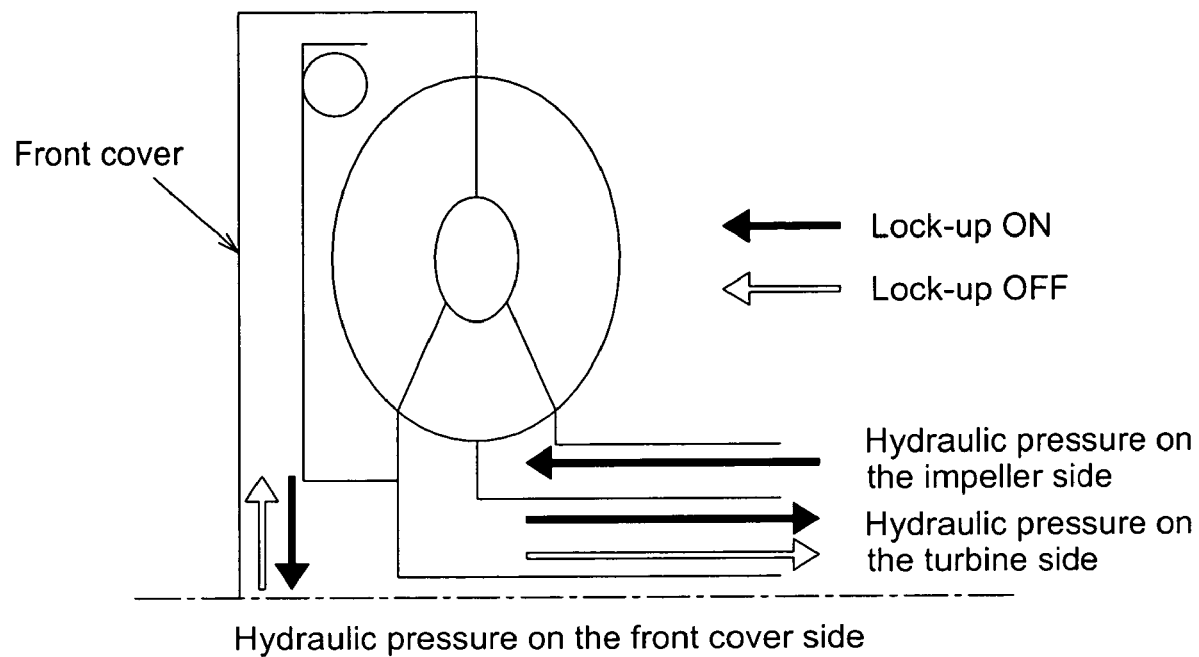
FIG. 8 is a diagram of the location of the hydraulic pressure measurement.

Changes over time of hydraulic pressures and torque waveforms concerning the responsivity of the lock-up were measured between the conventional product and the product according to the present invention. FIG. 7 shows the results, and FIG. 8 shows positions to be measured of the flow of the working fluid and the responsivity data. Note that the response time of lock-up ON is a time from an instant when signals of the hydraulic pressure are switched to an instant when the torque is started to be generated.

As is apparent from FIG. 7, in the product according to the present invention responsivity of lock-up ON became faster compared to the conventional product. In the torque converter operating range, the hydraulic pressure on the front cover side (the hydraulic pressure in the first hydraulic chamber 36) of the product according to the present invention was lower than that of the conventional product, and even at an instant when switched to the lock-up ON state, the hydraulic pressure on the front cover side (the hydraulic pressure in the first hydraulic chamber 36) of the product according to the present invention was lower than that of the conventional product. Meanwhile, when starting to move the lock-up piston, the working fluid could be smoothly exhausted toward the center in the first hydraulic chamber 36 so that the hydraulic pressure on the front cover side of the product according to the present invention became higher than that of the conventional product. However, it is assumed that the hydraulic pressure in the second hydraulic chamber 37 was equal to or more than that in the conventional product, and the working fluid was exhausted for a short time so that the responsivity of lock-up ON was improved.

Hereinbefore, although the embodiments of the present invention are described with reference to the figures, specific configurations are not limited these embodiments and can be changed without departing from the scope of the invention.

Although the present invention is applied to the torque converter in the embodiment, it can be applied to other types of the hydraulic torque transmission apparatuses.

Shapes, dimensions, relationships with other components and so on of the projections are not limited to the embodiments.

INDUSTRIAL APPLICABILITY

The present invention is applicable to lock-up devices of hydraulic torque transmitting apparatuses, particularly to lock-up devices having a piston that presses itself against the front cover.

The invention claimed is:

1. A lock-up device of a hydraulic torque transmitting apparatus including a front cover to which torque is input, an impeller fixed to the front cover to constitute a fluid chamber filled with a working fluid, and a turbine located opposite the impeller in the fluid chamber, the lock-up device comprising:
    a piston being located to divide a space between the front cover and the turbine into a first hydraulic chamber on a side of the front cover and a second hydraulic chamber on a side of the turbine, the piston being engageable with and disengageable from the front cover due to a differential pressure between the first and second hydraulic chambers,
    the piston including a plate-like main body having a piston surface formed on a first hydraulic chamber side, and a plurality of projections extending in the radial direction from the piston surface,
    each projection having a straight rotational front edge, a straight rotational rear edge, an arced radially outer edge, and an arced radially inner edge,
    the rotational rear edge intersecting a first straight line radially connecting a radially inner end thereof with a rotation center of the piston, or the rotational rear edge being inclined to the first straight line such that a radially outer end thereof is positioned rearward of the first straight line in the rotation direction, and
    the rotational front edge including a front wall surface extending from the piston surface and being inclined in the rotational direction with respect to the piston surface.

2. The lock-up device of the hydraulic torque transmitting apparatus according to claim 1, wherein the rotational front edge intersects a second straight line connecting a radially inner end of the rotational front edge with the rotation center, or the rotational front edge is inclined to the second straight line such that a radially outer end thereof is positioned rearward of the second straight line in the rotation direction.

3. The lock-up device of the hydraulic torque transmitting apparatus according to claim 2, wherein the front wall surface is inclined and extends from the piston surface at an angle βp relative to the piston surface,
    the rotational rear edge has a rear wall surface that is inclined and extends from the piston surface at an angle βs relative to the piston surface, and
    βp≦βs.

4. The lock-up device of the hydraulic torque transmitting apparatus according to claim 2, wherein $S_2 < S_1$, where $S_1$ is a circumferential length of the radially outer edge, and $S_2$ is a circumferential length of the radially inner edge.

5. The lock-up device of the hydraulic torque transmitting apparatus according to claim 4, wherein $S_2 < (2\pi r_2)/8$, where $r_2$ is a radius of the radially inner edge.

6. The lock-up device of the hydraulic torque transmitting apparatus according to claim 5, wherein $S_2$ is 6 mm or more.

7. The lock-up device of the hydraulic torque transmitting apparatus according to claim 4, wherein $S_1(2\pi r_1)/8$, where $r_1$ is a radius of the radially outer edge.

8. The lock-up device of the hydraulic torque transmitting apparatus according to claim 7, wherein $S_2$ is 6 mm or more.

9. The lock-up device of the hydraulic torque transmitting apparatus according to claim 7, wherein $S_2-(2\pi r_2)/8$, where $r_2$ is a radius of the radially inner edge.

10. The lock-up device of the hydraulic torque transmitting apparatus according to claim 9, wherein $S_2$ is 6 mm or more.

11. The lock-up device of the hydraulic torque transmitting apparatus according to claim 10, wherein the rotational front edge has a front wall surface that is inclined in the rotational direction and extends from the piston surface at an angle $\beta p$ relative to the piston surface, the rotational rear edge has a rear wall surface that is inclined in the rotational direction and extends from the piston surface at an angle $\beta s$ relative to the piston surface, and $\beta p \leq \beta s$.

12. The lock-up device of the hydraulic torque transmitting apparatus according to claim 11, wherein $\beta p < \beta s$.

13. The lock-up device of the hydraulic torque transmitting apparatus according to claim 12, wherein $\beta s$ is in the range between 80 degrees and 100 degrees, inclusive.

14. The lock-up device of the hydraulic torque transmitting apparatus according to claim 1, wherein the front wall surface that is inclined and extends from the piston surface at an angle $\beta p$ relative to the piston surface, the rotational rear edge in has a rear wall surface that is inclined and extends from piston surface at an angle $\beta s$ relative to the piston surface, and $\beta p \leq \beta s$.

15. The lock-up device of the hydraulic torque transmitting apparatus according to claim 14, wherein $\beta p < \beta s$.

16. The lock-up device of the hydraulic torque transmitting apparatus according to claim 1, wherein an angle $\beta s$ of the rear wall surface that extends from and relative to the piston surface is in the range between 80 degrees and 100 degrees, inclusive.

17. The lock-up device of the hydraulic torque transmitting apparatus according to claim 1, wherein the front wall surface is formed to extend from the piston surface toward the rotational rear edge.

18. The lock-up device of the hydraulic torque transmitting apparatus according to claim 1, wherein the rotational rear edge includes a rear wall surface that is inclined with respect to the piston surface.

19. The lock-up device of the hydraulic torque transmitting apparatus according to claim 18, wherein the rear wall surface is formed to extend from the piston surface toward the rotational front edge.

20. A lock-up device of a hydraulic torque transmitting apparatus including a front cover to which torque is input, an impeller fixed to the front cover to constitute a fluid chamber filled with a working fluid, and a turbine located opposite the impeller in the fluid chamber, the lock-up device comprising:

a piston being located to divide a space between the front cover and the turbine into a first hydraulic chamber on a side of the front cover and a second hydraulic chamber on a side of the turbine, the piston being engageable with and disengageable from the front cover due to a differential pressure between the first and second hydraulic chambers, the piston including a plate-like main body having a piston surface formed on a first hydraulic chamber side, and a plurality of projections extending in the radial direction and from the piston surface, each projection having a straight rotational front edge and a straight rotational rear edge, and an arced radially outer edge and an arced radially inner edge, the rotational front edge having a front wall surface inclined in the rotational direction and extending at an angle $\beta p$ from and relative to the piston surface, the rotational rear edge having a rear wall surface inclined in the rotational direction and extending at an angle $\beta s$ from and relative to the piston surface, and $\beta p \leq \beta s$.

21. The lock-up device of the hydraulic torque transmitting apparatus according to claim 20, wherein $\beta p < \beta s$.

22. The lock-up device of the hydraulic torque transmitting apparatus according to claim 21, wherein $\beta s$ is in the range between 80 degrees and 100 degrees, inclusive.

23. The lock-up device of the hydraulic torque transmitting apparatus according to claim 20, wherein $\beta s$ is in the range between 80 degrees and 100 degrees, inclusive.

* * * * *